United States Patent [19]

Wilson et al.

[11] Patent Number: 5,299,199
[45] Date of Patent: Mar. 29, 1994

[54] CHANNEL RE-ASSIGNMENT METHOD FOR TIME DIVISION MULTIPLE ACCESS (TDMA) TRUNKED SYSTEMS

[75] Inventors: Timothy J. Wilson, Schaumburg; Kenneth J. Crisler, Wheaton, both of Ill.

[73] Assignee: Motorola, Inc., Schaumburg, Ill.

[21] Appl. No.: 894,396

[22] Filed: Jun. 5, 1992

[51] Int. Cl.⁵ .............................................. H04J 3/16
[52] U.S. Cl. .................................... 370/95.3; 370/85.7
[58] Field of Search ................... 370/95.1, 95.3, 94.1, 370/85.7, 69.1; 455/34.1, 34.2, 58.2, 33.2, 33.1, 54.2; 379/63, 56, 60

[56] References Cited

U.S. PATENT DOCUMENTS

| | | | |
|---|---|---|---|
| 4,747,101 | 5/1988 | Akaiwa et al. | 370/95.1 |
| 4,754,450 | 6/1988 | Lynk, Jr. et al. | |
| 4,829,543 | 5/1989 | Borth et al. | |
| 4,887,266 | 12/1989 | Neve et al. | 370/95.1 |
| 4,949,336 | 8/1990 | Hamada et al. | 370/85.15 |
| 5,159,702 | 10/1992 | Aratake | 455/54.2 |
| 5,161,154 | 11/1992 | Diaz et al. | 370/85.7 |
| 5,163,047 | 11/1992 | Perdikaris et al. | 370/94.1 |

Primary Examiner—Douglas W. Olms
Assistant Examiner—Ajit Patel
Attorney, Agent, or Firm—James A. Coffing; Steven G. Parmelee

[57] ABSTRACT

A radio communication system controller embodies the present invention by providing extended use (306) of a communication resource (106) to a plurality of communication units. The inventive method includes the steps of assigning (402) a first communication resource to a first communication unit, and then temporarily configuring (406) the assigned communication resource as a reserved resource. The controller then receives (408), from a second communication unit, a request to transmit a second communication on the assigned communication resource. Lastly, the controller re-configures (412) the assigned communication resource to allow transmission of the second communication on the assigned communication resource.

24 Claims, 3 Drawing Sheets

500

CHANNEL RE-ASSIGNMENT METHOD FOR TIME DIVISION MULTIPLE ACCESS (TDMA) TRUNKED SYSTEMS

FIELD OF THE INVENTION

The invention relates, in general, to radio communication systems, and in particular, to communication systems which employ a time division multiple access (TDMA) signalling protocol.

BACKGROUND OF THE INVENTION

Trunked radio frequency (RF) communication systems are well known in the art. In such systems, a plurality of subscribers (e.g., mobiles, portables, consoles) share a limited number of communication resources, e.g., channels. In particular, channels are typically assigned to requesting subscribers by a communication resource controller, which request and assignment are exchanged via a common control channel. The controller might assign a channel to an individual subscriber for a single transmission such that, at the end of the subscriber's transmission, the channel is re-assigned to another subscriber (i.e., so-called transmission trunking).

In the alternative, the controller might assign a channel to a group of subscribers for engaging in a conversation, and keep the channel assignment active until completion of, or a substantial pause in, the conversation. That is, the assigned channel is not made available for re-assignment until the end of the conversation is anticipated. A conversation may include multiple transmissions from multiple subscribers and is referred to in the art as a message. Accordingly, this form of channel assignment is referred to as message trunking.

Subscribers attempting to engage in a conversation on a transmission trunked system are required to execute channel assignment request procedures for each transmission. Such procedures may result in significant transmission delay, particularly if an idle channel is not available at the time of the request. Message trunking eliminates the channel assignments within a conversation. Hence, message trunking presents benefits to the communication system users by allowing conversations to proceed in a more efficient and natural manner.

Prior art systems have attempted to offer message trunked services by appending a time delay, known as the "hang-time", to the end of each subscriber transmission. In these systems, the controller extends the assignment (i.e., leaves it open for another subscriber belonging to the group who wishes to transmit) for a predetermined period, or so-called hang-time. If no new transmission is begun by the completion of the hang-time, the system controller terminates the channel assignment. As long as the time intervals between successive transmissions are less than the hang-time, message trunking is effectuated.

During the course of a conversation, the communication controller typically receives transmissions from multiple subscribers. Each transmission may exhibit substantially different transmission characteristics, e.g., propagation delay, power level, etc. These differences are at least partially due to the subscribers being located at substantially different distances from the communications controller. Today's message trunked communication, e.g., frequency division multiplex (FDM) systems, simply accept each new transmission, and its associated transmission characteristics. Accordingly, the prior art method for accomplishing message trunking works well only for systems which are relatively robust with respect to differences in transmission characteristics between multiple subscribers. A new method is required for systems which are more sensitive to differences in subscriber transmission characteristics.

Communication systems employing time division multiple access (TDMA) signalling are well known. These systems divide an RF resource into a series of recurring time frames which are further divided into time-slots, as shown in FIG. 1. Time-slots 103, occurring periodically in time frames 101, constitute the communication channels of interest. As earlier described, the controller assigns a channel (i.e., time-slot) to a group of subscribers to enable a conversation among subscribers belonging to the group. That is, group members communicate (i.e., transmit and receive) information among themselves using the assigned time-slot. Unlike FDM systems, however, the timing of each subscriber transmission in a TDMA system must be strictly controlled to avoid interference among subscribers transmitting on adjacent time-slots. In particular, even slight differences in transmission parameters, e.g., propagation delay, power level, cause an undesirable level of inter-slot interference.

Many known systems control subscriber timing by enabling the controller to measure the arrival time of the received request on the control channel, and adjusting the timing prior to the first transmission on the assigned channel. However, this measurement is only applicable to the subscriber submitting the initial request for a channel assignment. Subsequent transmissions from other group members (i.e., which demonstrate substantial differences in transmission timing from the initiating subscriber) can cause interference with the time-slots adjacent to the assigned time-slot. Similarly, excessive power levels of uplink transmissions may cause interference among adjacent time-slots, resulting in performance degradation. Control of transmission power levels from the initiating subscriber, therefore, would help to enhance system performance.

Accordingly, there exists a need for a radio communication system which is able to maintain efficient usage of available communication resources, while limiting undesirable interference among those resources. In particular, a TDMA system which provides message trunking for group calls, would be an improvement over the prior art. That is, by reserving an assigned time-slot for the group members, and updating transmission parameters for each transmission, a TDMA radio system would not be constrained by foregoing limitations of today's systems.

DETAILED DESCRIPTION OF A PREFERRED EMBODIMENT

Figure 1:
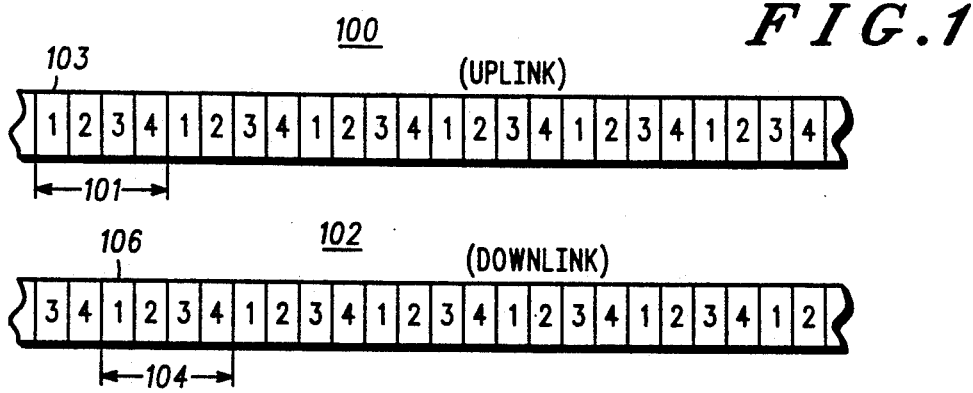
FIG. 1 shows a simplified graphical representation of an uplink data frame sequence and a downlink data frame sequence, as is well known in the art.

In a preferred embodiment of the invention, the communications resource takes the form of a particular set of slots on a time-division multiplexed (TDM) radio channel. The structure of the TDM radio channel is shown in FIG. 1. In particular, uplink 100 (i.e.,. transmitted from the subscriber to the central controller) and downlink 102 (i.e.,. transmitted from the central controller to the subscriber) signals are transmitted on two frequencies of a particular frequency pair. Uplink 100 is divided into time-slots 103, and a particular number of slots are grouped together into frames 101 (e.g., four slots in each frame, as shown in FIG. 1) and indicated by the numbering of the time-slots. The number of communications resources available on the TDM radio channel is equal to the number of time-slots in each frame. Similar to uplink 100, downlink 102 is divided into time-slots 106, and slots are grouped together into frames 104. In general, the uplink 100 and downlink 102 signals are partitioned in like manner (i.e., same number of time-slots per frame).

Figure 2:
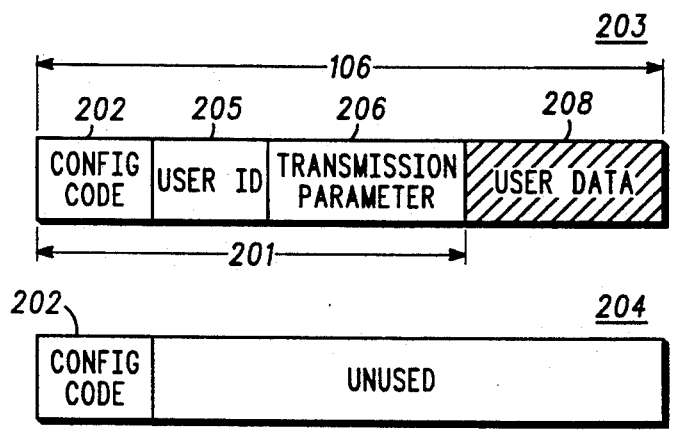
FIG. 2 shows a simplified graphical representation of a downlink slot, in accordance with the present invention.

FIG. 2 shows a more detailed view of the information contained in a particular downlink slot 106 as it might appear in two configurations. Each downlink slot 106 contains a slot descriptor block 201. The slot descriptor block includes a configuration code field 202, which field indicates a present configuration of the slot (i.e., user traffic, reserved, or unassigned configuration). Configuration 203 shows downlink slot 106 as it might be configured for user traffic, while configuration 204 shows the same downlink slot as it might be configured in both the reserved and unassigned modes, as later described.

In user traffic configuration (i.e., configuration 203), slot descriptor 201 contains a user identifier (ID) 205, transmission parametric data field 206, and user data field 208. In the reserved and unassigned configurations (i.e., configuration 204), slot descriptor 201 contains only the appropriate configuration code (e.g., "001" for reserved, and "000" for unassigned), while the remainder of the time-slot is unused. In a preferred embodiment, the radio system controller modifies slot descriptor 201 in downlink slot 106 to control the use of the time-slot as a communications resource, as shown by way of example using FIG. 3.

Figure 3:
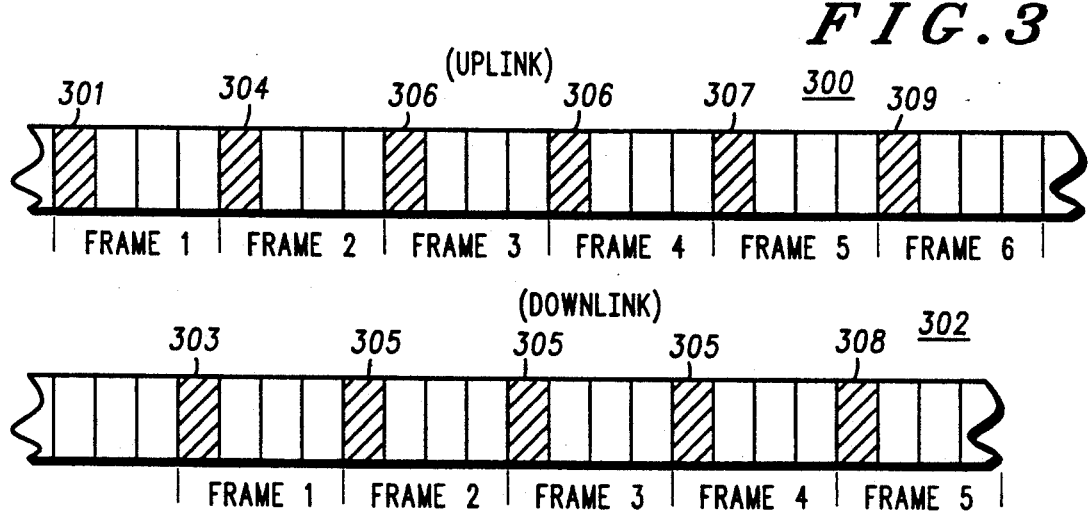
FIG. 3 shows a simplified graphical representation of an uplink data stream and a downlink data stream, in accordance with the present invention.

Referring to FIG. 3, there is shown an series of uplink frames 300, and a corresponding series of downlink frames 302. In a particular instance, the first slot of each frame is assigned to a particular communications group for use in participating in a conversation. For example, a first member of the group might be transmitting user data (301) into the assigned uplink slot, which is enabled by downlink slots being set to user traffic configuration (303). It should be noted that user data also appears on the assigned downlink slot, as previously described using FIG. 2 (i.e., field 208). Downlink user data signals are subsequently received by the transmitting unit as well as the remaining units of the communications group.

Prior to allowing a transmission, the controller updates the slot descriptor field (i.e., 201 shown in FIG. 2) of the downlink slot with information that is required for proper operation of the transmitting unit. That is, user ID field 205 identifies the transmitting unit whose right it is to now transmit into the assigned uplink slot 301. Slot descriptor field 201 also serves to convey the pertinent transmission parameters for the transmitting unit. In particular, transmission parameter field 206, which may be either a time advance value and/or a power level value as later described, is use to ensure that the uplink transmission does not interfere with adjacent channels (i.e., time-slots).

In a preferred embodiment, a time advance value is written to transmission parameter field 206, and is used to convey to the transmitting unit an amount of time it must advance, or delay, each of its uplink transmissions. This parameter is necessary to ensure that the transmissions arrive at the controller at the proper time despite the effects of propagation delay in the radio channel. The time advance value is based on a measurement made by the controller on the request-to-transmit signal received from a unit wishing to transmit on the next available time-slot. Similarly, a power control value instructs the transmitting unit as to the correct power level to use on the uplink transmission, such that the transmissions arrive at the controller with sufficient, but not excessive, power to avoid undesired interference. In a preferred embodiment, it is the time advance value which is conveyed to the transmitting unit, but an embodiment which either also, or instead, conveys the power control value is also contemplated by the present invention. Also, it should be noted that a communication unit which is able to detect its own transmission parameter (e.g., time advance value, power control value) is contemplated by the present invention.

In a preferred embodiment, when the transmitting unit completes the data transmission (e.g., voice data), it transmits a disconnect signal on a subsequent uplink time-slot (e.g., uplink slot 304). It should be noted that the disconnect signal could be replaced with any predetermined indicia, provided the controller was configured to recognize it. The controller then responds to the disconnect signal by re-configuring the assigned slot to create a reserved time-slot. The controller indicates this to members of the communications group by setting the configuration code (i.e., field 202) in the downlink slot to "reserved", as depicted in downlink time-slots 305. The slot is thereafter available, at least for a predetermined time as later described, to group members wishing to participate in the conversation (in a preferred embodiment, this includes the member who just completed a transmission). Until a group member transmits such a request, the assigned slot is empty, as depicted in uplink time-slots 306.

Uplink time-slot 307 depicts a request-to-transmit signal being transmitted by a requesting group unit. The request-to-transmit contains a requestor identification, which allows the controller to determine which unit is making the request. (It should be noted since the requesting unit does not yet have the required information regarding propagation delay for its transmissions, the duration of the request to transmit signal, is preferably slightly shorter than the duration of the uplink slot. This insures that the transmission does not interfere with the neighboring slots in spite of the unknown propagation delay.)

As previously discussed, the controller might derive several transmission parameters from the request-to-transmit sent by the requesting unit. The controller might measure the temporal position of the transmission, from which it determines a propagation delay characteristic of the requesting unit, and derive from that measurement a time advance value which applies to the requesting unit. Further, it might measure the received power level of the transmission, from which it derives a power control value which applies to the requesting unit. In either case, or in the case where the requesting unit might utilize both parameters to optimize its transmissions, the transmission parameters are conveyed to the requesting unit on a subsequent downlink slot.

In response to a valid request-to-transmit, the controller re-configures the assigned slot by setting the slot descriptor in the downlink slot to a user traffic configuration code. The controller updates the fields of the slot descriptor with the correct requestor ID, and transmission parameters(s). This information is conveyed to the requesting unit via the slot descriptor fields of the downlink slots 308, allowing the requesting unit to commence its user data transmission in subsequent time-slot 309. This sequence completes the preferred cycle, in accordance with the present invention.

Figure 4:
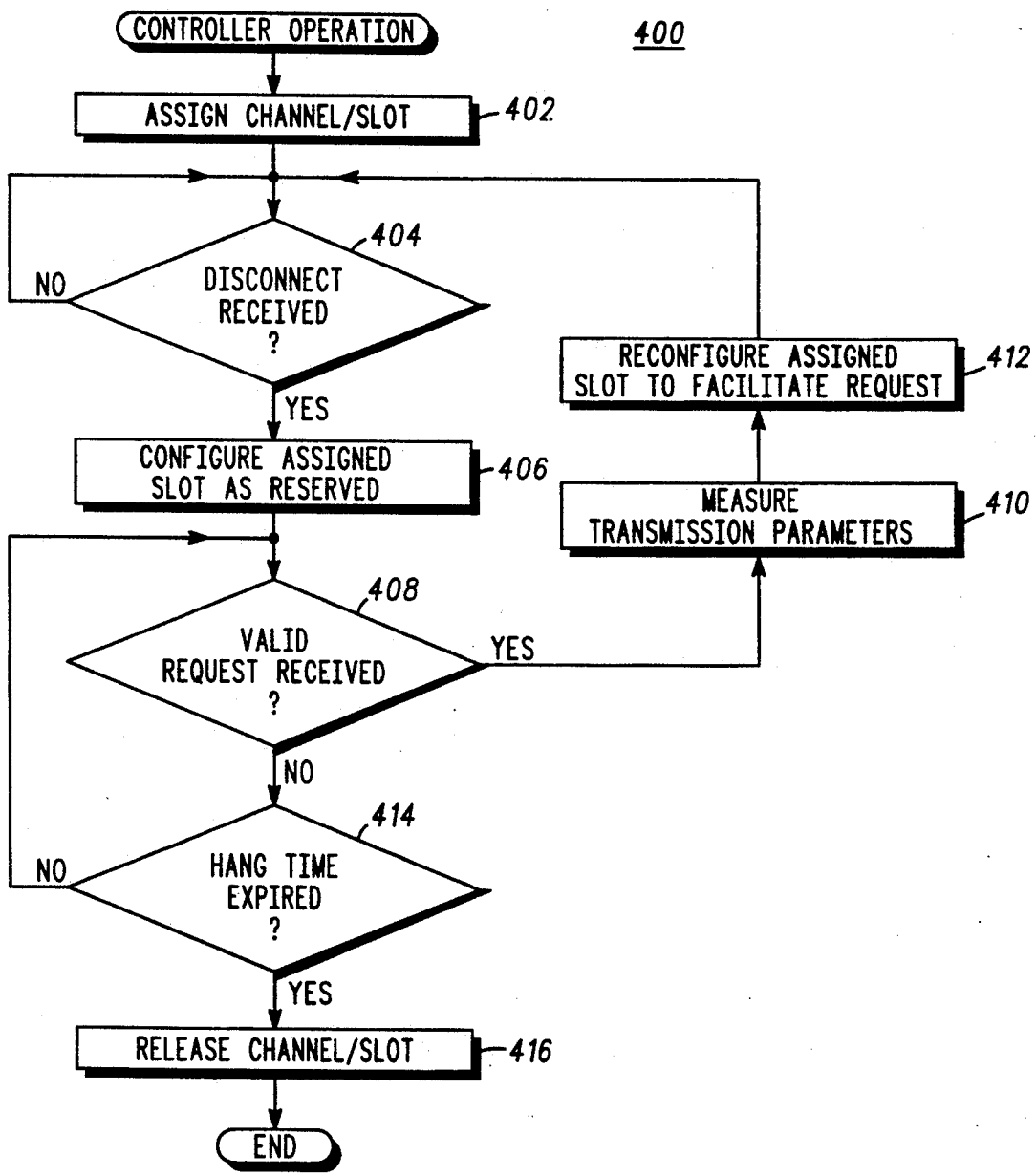
FIG. 4 shows a simplified flow diagram depicting the operation of a radio communication system controller, in accordance with the present invention.

FIG. 4 shows a flow diagram 400 depicting the operation of the radio communication system controller, in a preferred embodiment of the invention. The controller assigns (402) a TDM time-slot to a group of communication units, thereby establishing one member of the group as the transmitting unit. The controller then waits (404) until a disconnect is received from the transmitting unit, indicating completion of its transmission. When a disconnect is received, the controller configures (406) the assigned slot as a reserved slot, and waits (408), for a predetermined time as later described, to receive a valid request-to-transmit from a second, or the same, member of the group.

After a valid request is received, the controller measures (410) the appropriate transmission parameters (e.g., propagation delay characteristic, power level), from which it calculates a time advance and/or power control value. The controller then re-configures (412) the assigned slot to facilitate the request. That is, the controller changes the configuration code field to "user-traffic", and updates the user id and transmission parameter fields of the downlink slot (e.g., slot 203 of FIG. 2) to reflect the appropriate data for the requesting unit. These parameters are conveyed to all group members, allowing the requesting unit to respond, as later described using FIG. 5, by transmitting a message to the rest of the group. The controller then returns; waiting (404) to receive a disconnect from the new transmitting unit.

Returning to decision 408, if no request-to-transmit is received, the controller determines (414) whether or not a so-called "hang-time" has expired. The hang-time is simply a predetermined amount of time during which a group member may respond, via the reserved slot, before the slot is released to other system users. In a preferred embodiment, the hang-time ranges from one to 10 seconds, but other durations might be suitable, depending on system loading and typical message durations. If no request is received before the hang-time expires, the controller releases (416) the assigned/reserved slot by changing the configuration code to "unassigned", as depicted in slot 204 of FIG. 2.

Figure 5:
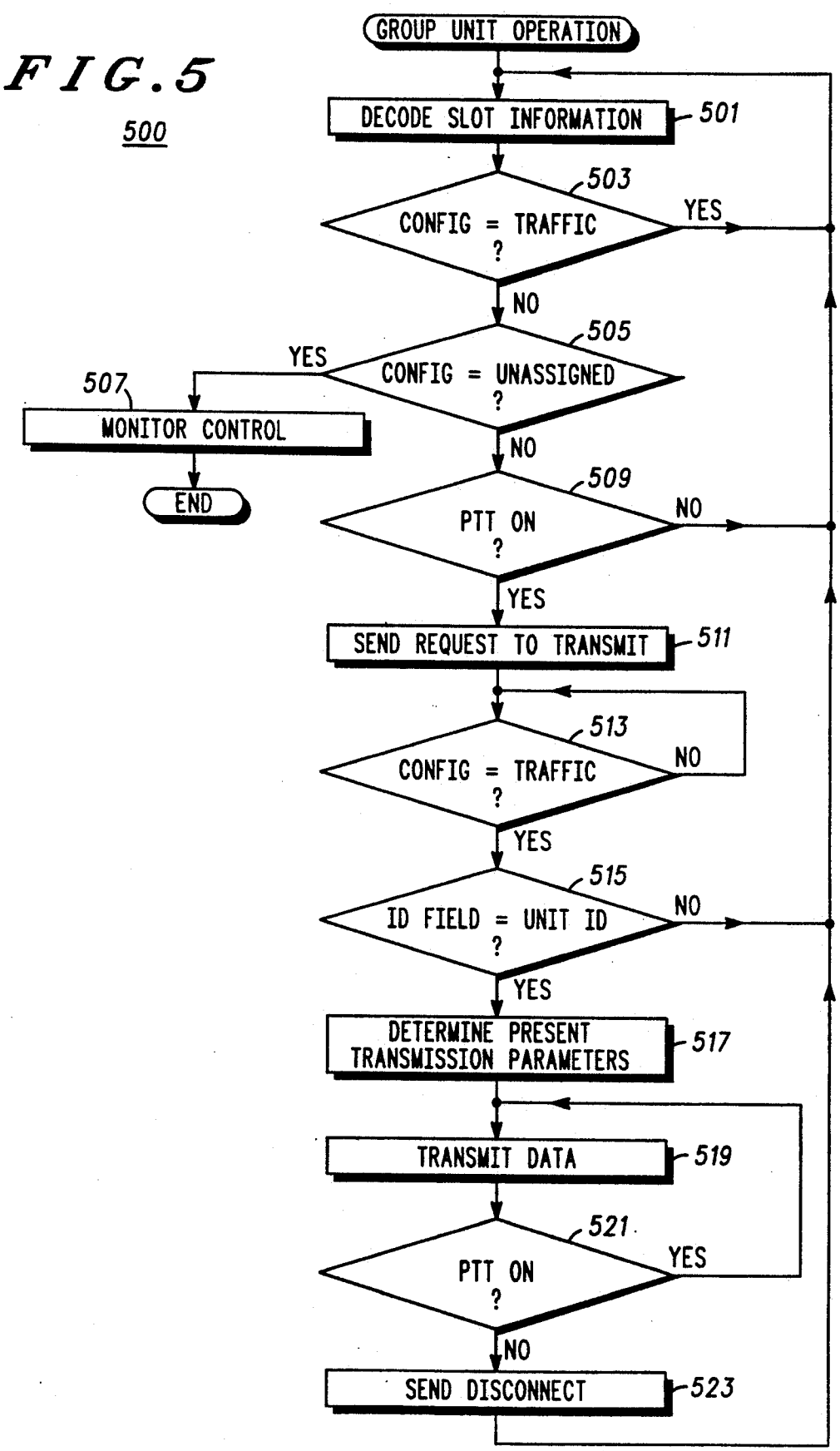
FIG. 5 shows a simplified flow diagram depicting the operation of a radio communication group unit, in accordance with the present invention.

FIG. 5 shows a flow diagram depicting the operation of a communication group unit, in accordance with the present invention. (FIG. 5 depicts the operation of a communication unit which is initially not the transmitting unit, but rather a group member monitoring a call.)

Having been assigned to the communication resource (i.e., slot), the unit decodes (501) the downlink slot information. The unit continues to evaluate the configuration code of the downlink slot until the configuration is no longer "user traffic". That is, so long as the configuration code remains "user traffic", the unit will continue to decode (501) the downlink slot information. Having determined (503) that the slot no longer holds traffic, the unit determines (505) whether or not the slot has been configured as "unassigned". If so, the unit reverts to monitoring (507) the control resource (e.g., another slot) and the routine is exited.

If it is determined (505) that the configuration code is not "unassigned" (i.e., it must be "reserved"), the unit determines (509) whether or not the user has asserted push-to-talk (PTT), which would indicate that the group unit wishes to become the transmitting unit. If PTT has not been asserted, the unit continues to decode (501) slot information, as before. If PTT has been asserted, the unit tries to acquire the right to transmit by sending (511) a request-to-transmit on the uplink slot. The unit then continuously checks (513) for the configuration code to change to "traffic", indicating that a valid request-to-transmit was received by the controller. When the configuration code changes to "traffic", the unit checks (515) the user ID field in the slot descriptor to see if it matches its own ID. If not, i.e., another unit has become the transmitting unit, the unit returns to decode (501) slot information. If the user ID field matches that of the unit, the unit determines (517) its present transmission parameter(s) (i.e., by reading the appropriate field in the slot descriptor block to obtain its time advance and/or power control values). Once it has been determined that the unit has the right to transmit on the assigned/reserved slot, the unit transmits (519) user data into the uplink slot, while continuously checking (521) for the PTT to be released. Upon release of the PTT, the unit sends (523) a disconnect signal on the uplink slot, and returns to decoding (501) downlink slot information.

In the foregoing manner, members of a communication group may exchange messages, via a single time-slot, until a conversation has been completed. That is, by reserving the assigned time-slot for a predetermined time (i.e., hang-time), the radio communication system can make efficient use of the limited communication resources available to users. Further, the TDMA system controller is able to maintain high volumes of group calls, using the aforementioned analogy to message-trunking, while sustaining superior levels of performance through reduced interference among adjacent time-slots.

What is claimed is:

1. In a radio communication system controller, a method of providing extended use of a communication resource to a plurality of communication units, the method comprising the steps of:
   A) assigning a first communication resource to a first of the plurality of communication units to produce an assigned communication resource;
   B) temporarily reserving, in response to a predetermined indicia received from the first communication unit during a first communication, the assigned communication resource such that a reserved communication resource is produced;
   C) receiving on the reserved communication resource, from a second of the plurality of communication units, a request to transmit a second communication on the assigned communication resource; and D) re-configuring, in response to the request, the assigned communication resource to allow transmission of the second communication on the assigned communication resource.

2. The method of claim 1, further comprising the step of:

E) measuring a transmission parameter for the second communication unit.

3. The method of claim 2, wherein step E comprises the step of:

E1) determining a time advance value based on a propagation delay characteristic of the request received from the second communication unit.

4. The method of claim 3, wherein step D comprises the step of:

D1) updating the assigned communication resource such that the time advance value is conveyed to the second communication unit.

5. The method of claim 2, wherein step E comprises the step of:

E1) determining a power control value of the request received from the second communication unit.

6. The method of claim 5, wherein step D comprises the step of:

D1) updating the assigned communication resource such that the power control value is conveyed to the second communication unit.

7. The method of claim 2, wherein step D comprises the step of:

D1) updating the assigned communication resource such that the measured transmission parameter is conveyed to the second communication unit.

8. The method of claim 1, wherein step C comprises the step of:

C1) identifying the second communication unit to produce a requestor identification (ID).

9. The method of claim 8, wherein step D comprises the step of:

D1) updating the assigned communication resource such that the requestor ID is conveyed to the second communication unit.

10. In a radio communication unit which is a member of a communication group, a method of responding to a first communication transmitted on an assigned communication resource, via a second communication transmitted on the assigned communication resource, the radio communication unit being in communication with a radio communication controller, the method comprising the steps of:

A) determining whether the first communication resource has been configured as a reserved communication resource;

B) sending to the radio communication controller, on the reserved communication resource, a request-to-transmit the second communication;

C) determining whether the reserved communication resource has been re-configured to accept the second communication; and D) transmitting, responsive to the step of determining whether the reserved communication resource has been re-configured, the second communication on the assigned communication resource.

11. The method of claim 10, further comprising the step of:

E) determining a time advance value for the communication unit based on a present transmission parameter for the communication unit.

12. The method of claim 11, wherein step E comprises the step of:

E1) receiving the time advance value from the radio controller.

13. The method of claim 11, wherein step E comprises the steps of:

E1) receiving the present transmission parameter from the radio controller; and

E2) calculating the time advance value based on the received present transmission parameter.

14. The method of claim 10, further comprising the step of:

E) determining a power control value for the communication unit based on a present transmission parameter for the communication unit.

15. The method of claim 14, wherein step E comprises the step of:

E1) receiving the power control from the radio controller.

16. The method of claim 14, wherein step E comprises the steps of:

E1) receiving the present transmission parameter from the radio controller; and

E2) calculating the power control value based on the received present transmission parameter.

17. In a time-division multiple-access (TDMA) radio communication system, a method, for use in a radio system controller, of providing extended use of one of a plurality of time-slots for communication among a plurality of communication units belonging to a communication group, each of the time-slots having data fields for conveying information, the method comprising the steps of:

A) assigning a first time-slot to a first of the plurality of communication units to produce an assigned time-slot;

B) updating, in response to a predetermined indicia received from the first communication unit during a first communication, a slot descriptor field of the assigned time-slot, such that the assigned time-slot is reserved for use by members of the communication group;

C) receiving, on the reserved time-slot from a second communication unit, a request to transmit a second communication;

D) re-configuring, in response to the request, the reserved time-slot to allow transmission of the second communication on the assigned time-slot; and E) measuring a transmission parameter for the second communication unit.

18. The method of claim 17, wherein step E comprises the step of:

E1) determining a time advance value based on a propagation delay characteristic of the request received from the second communication unit.

19. The method of claim 18, wherein step D comprises the step of:

D1) updating the slot descriptor field of the assigned time-slot such that the time advance value is conveyed to the second communication unit.

20. The method of claim 17, wherein step E comprises the step of:

E1) determining a power control value of the request received from the second communication unit.

21. The method of claim 20, wherein step D comprises the step of:
   D1) updating the slot descriptor field of the assigned time-slot such that the power control value is conveyed to the second communication unit.

22. In a time-division multiple-access (TDMA) radio communication unit which is a member of a communication group, a method of responding to a first communication transmitted on an assigned time-slot via a second communication transmitted on the assigned time-slot, the radio communication unit being in communication with a radio communication controller, the method comprising the steps of:
   A) determining whether the first time-slot has been configured as a reserved time-slot;
   B) sending to the radio communication controller, on the reserved time-slot, a request-to-transmit the second communication;
   C) determining whether the reserved time-slot has been reconfigured to accept the second communication;
   D) transmitting, responsive to the step of determining whether the reserved time-slot has been re-configured, the second communication on the assigned time-slot; and
   E) determining a time advance value for the communication unit based on a present transmission parameter for the communication unit.

23. The method of claim 22, wherein step E comprises the step of:
   E1) receiving the time advance value from the radio controller.

24. The method of claim 22, wherein step E comprises the steps of:
   E1) receiving the present transmission parameter from the radio controller; and
   E2) calculating the time advance value based on the received present transmission parameter.

* * * * *